(12) United States Patent
Lee et al.

(10) Patent No.: US 10,866,931 B2
(45) Date of Patent: Dec. 15, 2020

(54) DESKTOP APPLICATION FOR ACCESSING A CLOUD COLLABORATION PLATFORM

(71) Applicant: Box, Inc., Los Altos, CA (US)

(72) Inventors: Sang Lee, Los Altos, CA (US); Matthew Self, Emerald Hills, CA (US); Ryan Knotts, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 504 days.

(21) Appl. No.: 14/521,134

(22) Filed: Oct. 22, 2014

(65) Prior Publication Data

US 2015/0112927 A1 Apr. 23, 2015

Related U.S. Application Data

(60) Provisional application No. 61/894,340, filed on Oct. 22, 2013.

(51) Int. Cl.
*G06F 16/178* (2019.01)
*H04L 29/08* (2006.01)
*G06F 16/188* (2019.01)

(52) U.S. Cl.
CPC .......... *G06F 16/178* (2019.01); *G06F 16/188* (2019.01); *H04L 67/1097* (2013.01)

(58) Field of Classification Search
CPC .. G06F 17/30017; G06F 19/326; G06F 17/24; G06F 17/30; G06F 3/041;
(Continued)

(56) References Cited

U.S. PATENT DOCUMENTS 5,301,348 A 4/1994 Jaaskelainen
5,576,946 A 11/1996 Bender et al.
(Continued)

FOREIGN PATENT DOCUMENTS

CA 2724521 11/2009
CN 101997924 A 3/2011
(Continued)

OTHER PUBLICATIONS

Exam Report for GB1312874.9 Applicant: Box, Inc. dated Sep. 26, 2014, 2 pages.
(Continued)

*Primary Examiner* — Mariela Reyes
*Assistant Examiner* — Courtney Harmon
(74) *Attorney, Agent, or Firm* — Sheridan Ross P.C.

(57) ABSTRACT

Embodiments of the present disclosure include systems and methods of a desktop application for accessing a cloud collaboration platform. The disclosed application utilizes a native desktop environment to provide a better cloud collaboration experience by making the cloud-based platform accessible for file editing, file opening/closing/previewing, moving files between the local desktop environment and a web application (e.g., native to the cloud-based platform), syncing folders or marking any folders or parents/children of any folders to sync and/or utilizing any of the collaborative features (e.g., emailing links or inviting collaborators to collaborate on a file directly via the desktop environment using native contacts or contacts in the web app environment).

21 Claims, 16 Drawing Sheets

(58) Field of Classification Search
CPC ........ G06F 16/27; G06F 16/951; G06F 21/57; G06F 16/178
See application file for complete search history.

(56) References Cited

U.S. PATENT DOCUMENTS

| | | | |
|---|---|---|---|
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,893,126 A | 4/1999 | Drews et al. |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,097,390 A | 8/2000 | Marks |
| 6,098,078 A | 8/2000 | Gehani et al. |
| 6,233,600 B1 | 5/2001 | Sales et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,789,109 B2 | 9/2004 | Samra et al. |
| 6,859,909 B1 | 2/2005 | Lerner et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,107,549 B2 | 9/2006 | Deaton et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,435 B1 | 12/2006 | Day et al. |
| 7,155,483 B1 | 12/2006 | Friend et al. |
| 7,165,107 B2 | 1/2007 | Pouyoul et al. |
| 7,213,206 B2 | 5/2007 | Fogg |
| 7,222,078 B2 | 5/2007 | Abelow |
| 7,243,299 B1 | 7/2007 | Rubin et al. |
| 7,246,118 B2 | 7/2007 | Chastain et al. |
| 7,275,244 B1 | 9/2007 | Charles Bell et al. |
| 7,296,025 B2 | 11/2007 | Kung et al. |
| 7,305,436 B2 | 12/2007 | Willis |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,437,421 B2 | 10/2008 | Bhogal et al. |
| 7,467,415 B2 | 12/2008 | Carter |
| 7,496,830 B2 | 2/2009 | Rubin et al. |
| 7,496,841 B2 | 2/2009 | Hadfield et al. |
| 7,543,000 B2 | 6/2009 | Castro et al. |
| 7,581,221 B2 | 8/2009 | Lai et al. |
| 7,620,565 B2 | 11/2009 | Abelow |
| 7,627,831 B2 | 12/2009 | Chiu et al. |
| 7,647,559 B2 | 1/2010 | Yozell-Epstein et al. |
| 7,650,367 B2 | 1/2010 | Arruza |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,930,418 B2 | 4/2011 | Samra et al. |
| 7,937,663 B2 | 5/2011 | Parker et al. |
| 7,958,453 B1 | 6/2011 | Taing |
| 7,962,853 B2 | 6/2011 | Bedi et al. |
| 7,979,296 B2 | 7/2011 | Kruse et al. |
| 7,996,374 B1 | 8/2011 | Jones et al. |
| 8,024,661 B2 | 9/2011 | Bibliowicz et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,108,779 B1 | 1/2012 | Rein et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,214,747 B1 * | 7/2012 | Yankovich ............ G06F 9/4451 715/751 |
| 8,230,348 B2 | 7/2012 | Peters et al. |
| 8,347,276 B2 | 1/2013 | Schadow |
| 8,358,701 B2 | 1/2013 | Chou et al. |
| 8,374,944 B2 | 2/2013 | Robb |
| 8,429,540 B1 | 4/2013 | Yankovich et al. |
| 8,464,161 B2 | 6/2013 | Giles et al. |
| 8,527,549 B2 | 9/2013 | Cidon |
| 8,549,066 B1 | 10/2013 | Donahue et al. |
| 8,549,511 B2 | 10/2013 | Seki et al. |
| 8,607,306 B1 | 12/2013 | Bridge et al. |
| 8,682,973 B2 | 3/2014 | Kikin-Gil et al. |
| 8,706,810 B2 | 4/2014 | Vishnubhatla et al. |
| 8,756,513 B1 | 6/2014 | Schmieder et al. |
| 8,849,955 B2 | 9/2014 | Prahlad et al. |
| 8,892,679 B1 | 11/2014 | Destagnol et al. |
| 8,943,197 B1 | 1/2015 | Taylor et al. |
| 9,053,079 B2 | 6/2015 | Bailor et al. |
| 9,063,912 B2 | 6/2015 | Seibert, Jr. et al. |
| 9,069,743 B2 | 6/2015 | Kotler et al. |
| 9,223,635 B2 | 12/2015 | Huang et al. |
| 9,224,073 B2 | 12/2015 | Okajima |
| 9,224,129 B2 | 12/2015 | Sitrick et al. |
| 9,235,268 B2 | 1/2016 | Arrasvuori et al. |
| 9,252,962 B1 | 2/2016 | Valeti |
| 9,256,341 B2 | 2/2016 | Megiddo et al. |
| 9,357,076 B2 | 5/2016 | Rosenberg |
| 9,483,473 B2 | 11/2016 | Ansel et al. |
| 2001/0027492 A1 | 10/2001 | Gupta |
| 2002/0049786 A1 | 4/2002 | Bibliowicz et al. |
| 2002/0091738 A1 | 7/2002 | Rohrbaugh et al. |
| 2002/0099552 A1 | 7/2002 | Rubin et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0009459 A1 | 1/2003 | Chastain et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0217171 A1 | 11/2003 | Von Stuermer et al. |
| 2004/0021686 A1 | 2/2004 | Barberis |
| 2004/0088647 A1 | 5/2004 | Miller et al. |

(56) References Cited

U.S. PATENT DOCUMENTS

| | | |
|---|---|---|
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0172588 A1 | 9/2004 | Mattaway |
| 2004/0177138 A1 | 9/2004 | Salle et al. |
| 2004/0181579 A1 | 9/2004 | Huck et al. |
| 2004/0221239 A1 | 11/2004 | Hachigian et al. |
| 2004/0230624 A1 | 11/2004 | Frolund et al. |
| 2004/0246532 A1 | 12/2004 | Inada |
| 2004/0250201 A1 | 12/2004 | Caspi |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0018828 A1 | 1/2005 | Nierhaus et al. |
| 2005/0022229 A1 | 1/2005 | Gabriel et al. |
| 2005/0028006 A1 | 2/2005 | Leser et al. |
| 2005/0033813 A1 | 2/2005 | Bhogal et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0209808 A1 | 9/2005 | Kelbon et al. |
| 2005/0234864 A1 | 10/2005 | Shapiro |
| 2005/0234943 A1 | 10/2005 | Clarke |
| 2005/0261933 A1 | 11/2005 | Magnuson |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0080432 A1 | 4/2006 | Spataro et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0084984 A1 | 4/2008 | Levy et al. |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0147810 A1 | 6/2008 | Kumar et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1 | 2/2009 | Baumgarten et al. |
| 2009/0049131 A1 | 2/2009 | Lyle et al. |
| 2009/0094546 A1 | 4/2009 | Anzelde et al. |
| 2009/0106642 A1 | 4/2009 | Albornoz et al. |
| 2009/0111509 A1 | 4/2009 | Medinieks et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0040217 A1 | 2/2010 | Aberg et al. |
| 2010/0042720 A1 | 2/2010 | Stienhans et al. |
| 2010/0057560 A1 | 3/2010 | Skudlark et al. |

(56) References Cited

U.S. PATENT DOCUMENTS

| | | |
|---|---|---|
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2010/1318893 | 12/2010 | Matthews et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0113320 A1 | 5/2011 | Neff et al. |
| 2011/0119313 A1 | 5/2011 | Sung et al. |
| 2011/0134204 A1 | 6/2011 | Rodriguez et al. |
| 2011/0137991 A1 | 6/2011 | Russell |
| 2011/0142410 A1 | 6/2011 | Ishii |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209052 A1 | 8/2011 | Parker et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0249024 A1 | 10/2011 | Arrasvuori et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0036423 A1 | 2/2012 | Haynes, II et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0192099 A1 | 7/2012 | Carbonera et al. |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0221937 A1 | 8/2012 | Patterson et al. |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1 | 10/2012 | Elhadad et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |

(56) References Cited

U.S. PATENT DOCUMENTS

| | | |
|---|---|---|
| 2013/0007894 A1 | 1/2013 | Dang et al. |
| 2013/0013560 A1 | 1/2013 | Goldberg et al. |
| 2013/0013812 A1* | 1/2013 | Kessel .................. G06Q 10/10 709/248 |
| 2013/0014023 A1 | 1/2013 | Lee et al. |
| 2013/0024418 A1 | 1/2013 | Sitrick et al. |
| 2013/0031208 A1 | 1/2013 | Linton et al. |
| 2013/0042106 A1 | 2/2013 | Persaud et al. |
| 2013/0047093 A1 | 2/2013 | Reuschel et al. |
| 2013/0055127 A1 | 2/2013 | Saito et al. |
| 2013/0067232 A1 | 3/2013 | Cheung et al. |
| 2013/0067594 A1* | 3/2013 | Kantor ................ G06F 21/6218 726/28 |
| 2013/0073403 A1 | 3/2013 | Tuchman et al. |
| 2013/0080913 A1 | 3/2013 | Rodrig et al. |
| 2013/0080919 A1 | 3/2013 | Kiang et al. |
| 2013/0080966 A1 | 3/2013 | Kikin-Gil et al. |
| 2013/0091440 A1 | 4/2013 | Kotler et al. |
| 2013/0097481 A1 | 4/2013 | Kotler et al. |
| 2013/0117240 A1 | 5/2013 | Taylor et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0151940 A1 | 6/2013 | Bailor et al. |
| 2013/0155071 A1 | 6/2013 | Chan et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0169742 A1 | 7/2013 | Wu et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0215116 A1* | 8/2013 | Siddique ............ G06Q 30/0643 345/420 |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0305039 A1 | 11/2013 | Gauda |
| 2013/0311551 A1 | 11/2013 | Thibeault |
| 2013/0326344 A1 | 12/2013 | Masselle et al. |
| 2013/0347094 A1* | 12/2013 | Bettini .................. G06F 21/577 726/11 |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0019882 A1 | 1/2014 | Chew et al. |
| 2014/0026025 A1 | 1/2014 | Smith |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0280961 A1 | 9/2014 | Martinez et al. |
| 2014/0310345 A1 | 10/2014 | Megiddo et al. |
| 2014/0351346 A1* | 11/2014 | Barton .................... H04L 51/00 709/206 |
| 2015/0135097 A1* | 5/2015 | Carriero ............ G06F 17/3089 715/753 |

FOREIGN PATENT DOCUMENTS

| | | |
|---|---|---|
| CN | 102264063 A | 11/2011 |
| EP | 0921661 A2 | 6/1999 |
| EP | 1349088 | 10/2003 |
| EP | 1528746 A2 | 5/2005 |
| EP | 2372574 A1 | 10/2011 |
| EP | 2610776 A2 | 7/2013 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Exam Report for GB1415126.0 Applicant: Box, Inc. dated Oct. 2, 2014, 8 pages.

Exam Report for GB1415314.2 Applicant: Box, Inc. dated Oct. 7, 2014, 6 pages.

Exam Report for GB1415314.2; Applicant: Box, Inc. dated Aug. 14, 2015, 2 pages.

Matt V., "Comparison of Lightbox-type Modules," (http://web.archive.org/web/20130510120527/http://drupal.org/node/266126; dated May 10, 2013; last accessed Jun. 23, 2015, 15 pages.

"Average Conversion Time for a D60 RAW file?" http://www.dpreview.com, Jul. 22, 2002, 4 pages.

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

"How-to Geek, How to Sync Specific Folders With Dropbox," downloaded from the internet http://www.howtogeek.com, Apr. 23, 2013, 5 pages.

"Microsoft Office SharePoint 2007 User Guide," Feb. 16, 2010, pp. 1-48.

"PaperPort Professional 14," PC Mag. Com review, published Feb. 2012, Ziff Davis, Inc., 8 pages.

"PaperPort," Wikipedia article (old revision), published May 19, 2012, Wikipedia Foundation, 2 pages.

"Quickoffice Enhances Android Mobile office Application for Improved Productivity on latest Smartphone and Table Devices," QuickOffice Press Release, Nov. 21, 2011, QuickOffice Inc., 2 pages.

"QuickOffice," Wikipedia Article (old revision), published May 9, 2012, Wikipedia Foundation, 2 pages.

"Revolving sync conflicts; frequently asked questions," Microsoft Tech Support, Jul. 16, 2012, retrieved from the Internet: http://web.archive.org/web, 2 pages.

(56) References Cited

OTHER PUBLICATIONS

"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
"Understanding Metadata," National Information Standards Organization, NISO Press, 2004, 20 pages.
Burns, "Developing Secure Mobile Applications for Android," Oct. 2008, Version 1.0, 1-28 pages.
Cisco, "FTP Load Balancing on ACE in Routed Mode Configuration Example," DocWiki, Jun. 2011, 7 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Conner, "Google Apps: The Missing Manual," published by O'Reilly Media, May 27, 2008, 24 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13158415.3, Applicant: Box, Inc, dated Jun. 4, 2013, 8 pages.
Exam Report for EP13168784.0, Applicant: Box, Inc, dated Nov. 21, 2013, 7 pages.
Exam Report for EP13177108.1, Applicant: Box, Inc, dated May 26, 2014, 6 pages.
Exam Report for EP13185269.1, Applicant: Box, Inc, dated Jan. 28, 7 pages.
Exam Report for GB1300188.8, Applicant: Box, Inc, dated May 31, 2013, 8 pages.
Exam Report for GB1306011.6, Applicant: Box, Inc, dated Apr. 18, 2013, 8 pages.
Exam Report for GB1308842.2, Applicant: Box, Inc, dated Mar. 10, 2014, 4 pages.
Exam Report for GB1309209.3, Applicant: Box, Inc, dated Oct. 30, 2013, 11 pages.
Exam Report for GB1310666.1, Applicant: Box, Inc, dated Aug. 30, 2013, 10 pages.
Exam Report for GB1311417.8, Applicant: Box, Inc, dated Dec. 23, 2013, 5 pages.
Exam Report for GB1312095.1, Applicant: Box, Inc, dated Dec. 12, 2013, 7 pages.
Exam Report for GB1312264.3, Applicant: Box, Inc, dated Mar. 24, 2014, 7 pages.
Exam Report for GB1312874.9, Applicant: Box, Inc, dated Dec. 20, 2013, 11 pages.
Exam Report for GB1313559.5, Applicant: Box, Inc., dated Aug. 22, 2013, 19 pages.
Exam Report for GB1314771.5, Applicant: Box, Inc, dated Feb. 17, 2014, 7 pages.
Exam Report for GB1316532.9, Applicant: Box, Inc, dated Oct. 31, 2013, 10 pages.
Exam Report for GB1316533.7, Applicant: Box, Inc, dated Oct. 8, 2013, 9 pages.
Exam Report for GB1316971.9, Applicant: Box, Inc, dated Nov. 26, 2013, 10 pages.
Exam Report for GB1317600.3, Applicant: Box, Inc, dated Nov. 21, 2013, 8 pages.
Exam Report for GB1318373.6, Applicant: Box, Inc, dated Dec. 17, 2013, 4 pages.
Exam Report for GB1318792.7, Applicant: Box, Inc, dated May 22, 2014, 2 pages.
Exam Report for GB1320902.8, Applicant: Box, Inc, dated Dec. 20, 2013, 6 pages.
Exam Report for GB1410569.6 Applicant: Box, Inc, dated Jul. 11, 2014, 9 pages.
Extended Search Report for EP131832800, Applicant: Box, Inc, dated Aug. 25, 2014, 7 pages.
Extended Search Report for EP141509422, Applicant: Box, Inc, dated Aug. 26, 2014, 12pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013, pp. 1-10.
International Search Report and Written Opinion for PCT/US2011/056472 dated Jun. 22, 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30, 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/US2012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.
International Search Report and Written Opinion for PCT/US2013/023889, Applicant: Box, Inc., dated Jun. 24, 2013, 13 pages.
International Search Report and Written Opinion for PCT/US2013/029520, Applicant: Box, Inc., dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/034765, Applicant: Box, Inc., dated Jan. 20, 2014, 15 pages.
International Search Report and Written Opinion for PCT/US2013/035404, Applicant: Box, Inc., dated Jun. 26, 2013, 11 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/Internet_forums, Wikipedia, May 30, 2010, pp. 1-20.
John et al., "Always Sync Support Forums—View topic—Allway sync funny behavior," Allway Sync Support Forum at http://sync-center.com, Mar. 28, 2011, XP055109680, 2 pages.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Partial Search Report for EP131832800, Applicant: Box, Inc, dated May 8, 2014, 5 pages.
Patent Court Document of Approved Judgment for GB0602349.3 and GB0623571.7; Mar. 3, 2009, 17 pages.
Pyle et al. "How to enable Event logging for Offline Files (Client Side Caching) in Windows Vista," Feb. 18, 2009, retrieved from the internet: http://blogs.technet.com, 3 pages.

(56) References Cited

OTHER PUBLICATIONS

Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Search Report for EP 11729851.3, Applicant: Box, Inc, dated Feb. 7, 2014, 9 pages.
Search Report for EP 13189144.2 Applicant: Box, Inc, dated Sep. 1, 2014, 9 pages.
Search Report for EP13187217.8, Applicant: Box, Inc, dated Apr. 15, 2014, 12 pages.
Search Report for EP141509422, Applicant: Box, Inc, dated May 8, 2014, 7 pages.
Search Report for EP14151588.2, Applicant: Box, Inc, dated Apr. 15, 2014, 12 pages.
Search Report for EP14153783.7, Applicant: Box, Inc, dated Mar. 24, 2014, 7 pages.
Sommerer, "Presentable Document Format: Improved On-demand PDF to HTML Conversion," retrieved from the internet, http://research.microsoft.com, Nov. 2004, 8 pages.
Supplementary European Search Report European Application No. EP 08 85 8563 dated Jun. 20, 2011 pp. 1-5.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.

\* cited by examiner

DESKTOP APPLICATION FOR ACCESSING A CLOUD COLLABORATION PLATFORM

CROSS-REFERENCE TO RELATED APPLICATION(S)

This application is entitled to the benefit of and/or the right of priority to U.S. Provisional Application No. 61/894,340, entitled "DESKTOP APPLICATION FOR ACCESSING A CLOUD COLLABORATION PLATFORM", filed Oct. 22, 2013, which is hereby incorporated by reference in its entirety.

BACKGROUND

In the field of cloud-based storage and collaboration technology, synchronization applications provide a suitable solution for synchronizing personal files and the files of small teams that collaborate on projects. However, existing solutions are not suitable to serve as a shared-drive replacement, because users cannot synchronize all of the shared files at every user's computer device. This involves too much storage space, too much bandwidth utilization, and can increase the risk of data loss. Accordingly, various systems and methods associated with an integrated desktop application are disclosed herein for providing users with efficient access to all content stored in a cloud-based collaboration platform

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
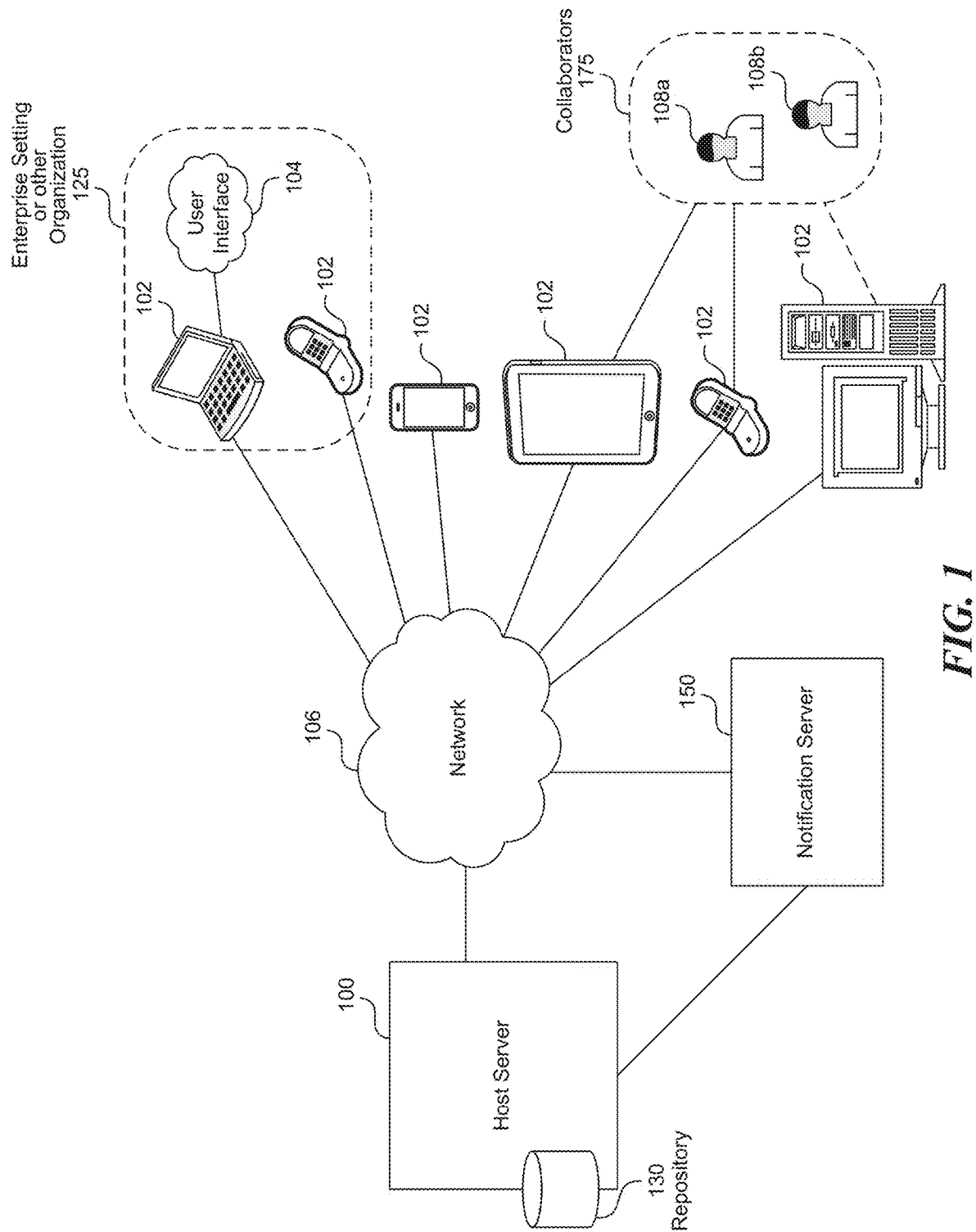
FIG. 1 illustrates an example diagram of a system having a host server of a cloud service (e.g., collaboration or file sharing platform) and/or cloud storage accounts with capabilities for enabling a desktop application such as described herein for accessing a cloud-based collaboration platform.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for enabling a desktop application such as described herein for accessing a cloud-based collaboration platform.

Cloud-Based Collaboration Platform

FIG. 1 illustrates an example diagram of a system having a host server 100 of a cloud service (e.g., collaboration or file sharing platform) and/or cloud storage accounts with capabilities for enabling a desktop application such as described herein for accessing a cloud-based collaboration platform.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102 and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a cloud-based collaboration platform or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
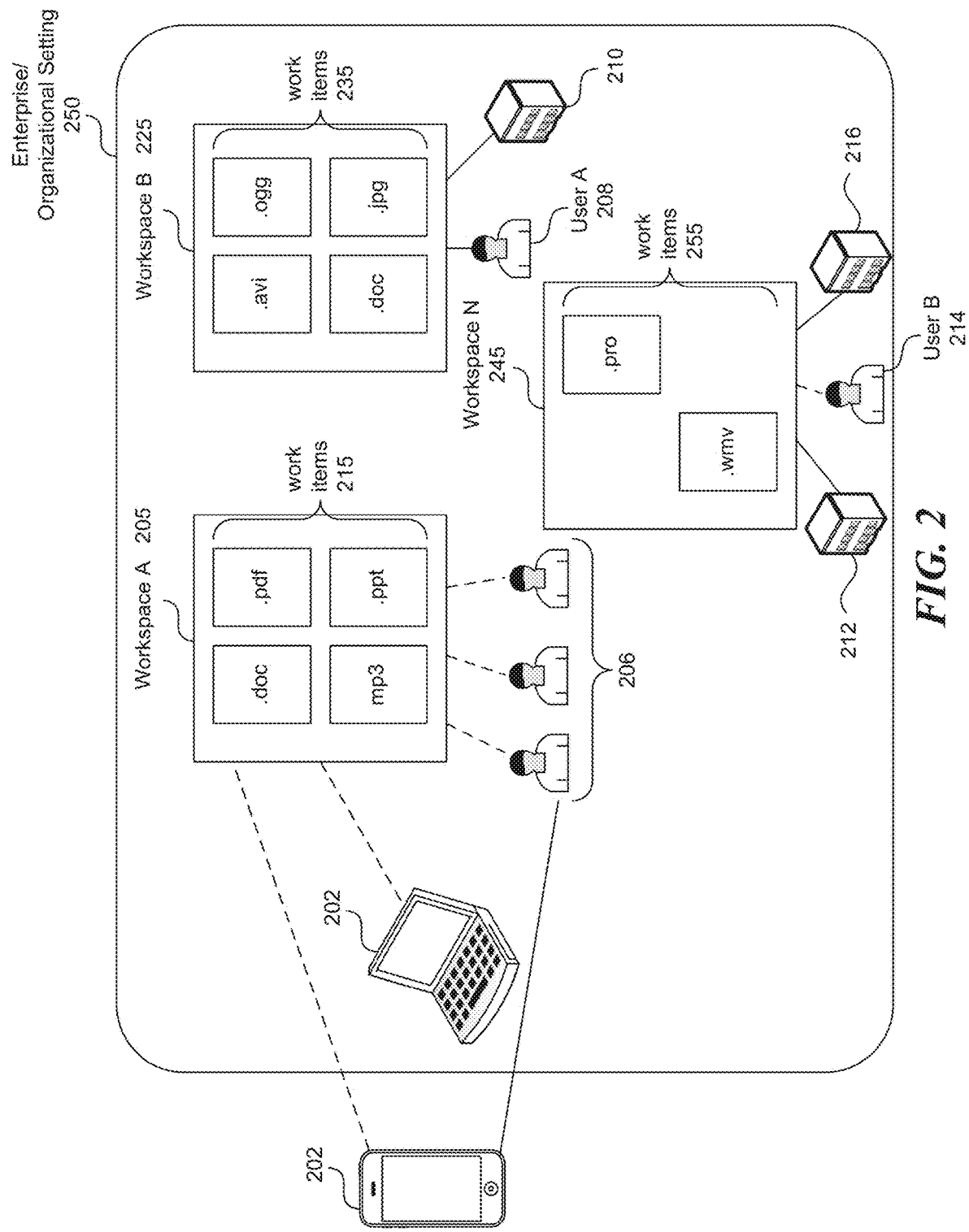
FIG. 2 depicts a diagram of a cloud-based or online collaboration platform deployed in an enterprise or other organizational setting for organizing work items and workspaces, as one example of a collaboration or file sharing service which may be or include hosted cloud service and/or cloud storage with capabilities enabling a desktop application such as described herein for accessing a cloud-based collaboration platform.

A diagrammatic illustration of the online collaboration platform and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of cloud-based services and/or cloud storage such as an online or cloud-based collaboration platform is able to track or monitor the devices used by users to access content or activities.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts a diagram of a cloud-based or online collaboration platform deployed in an enterprise or other organizational setting 250 for organizing work items 215, 235, 255 and workspaces 205, 225, 245, as one example of a collaboration or file sharing service which may be or include hosted cloud service and/or cloud storage with capabilities for enabling a desktop application such as described herein for accessing a cloud-based collaboration platform.

The cloud-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N 245 can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
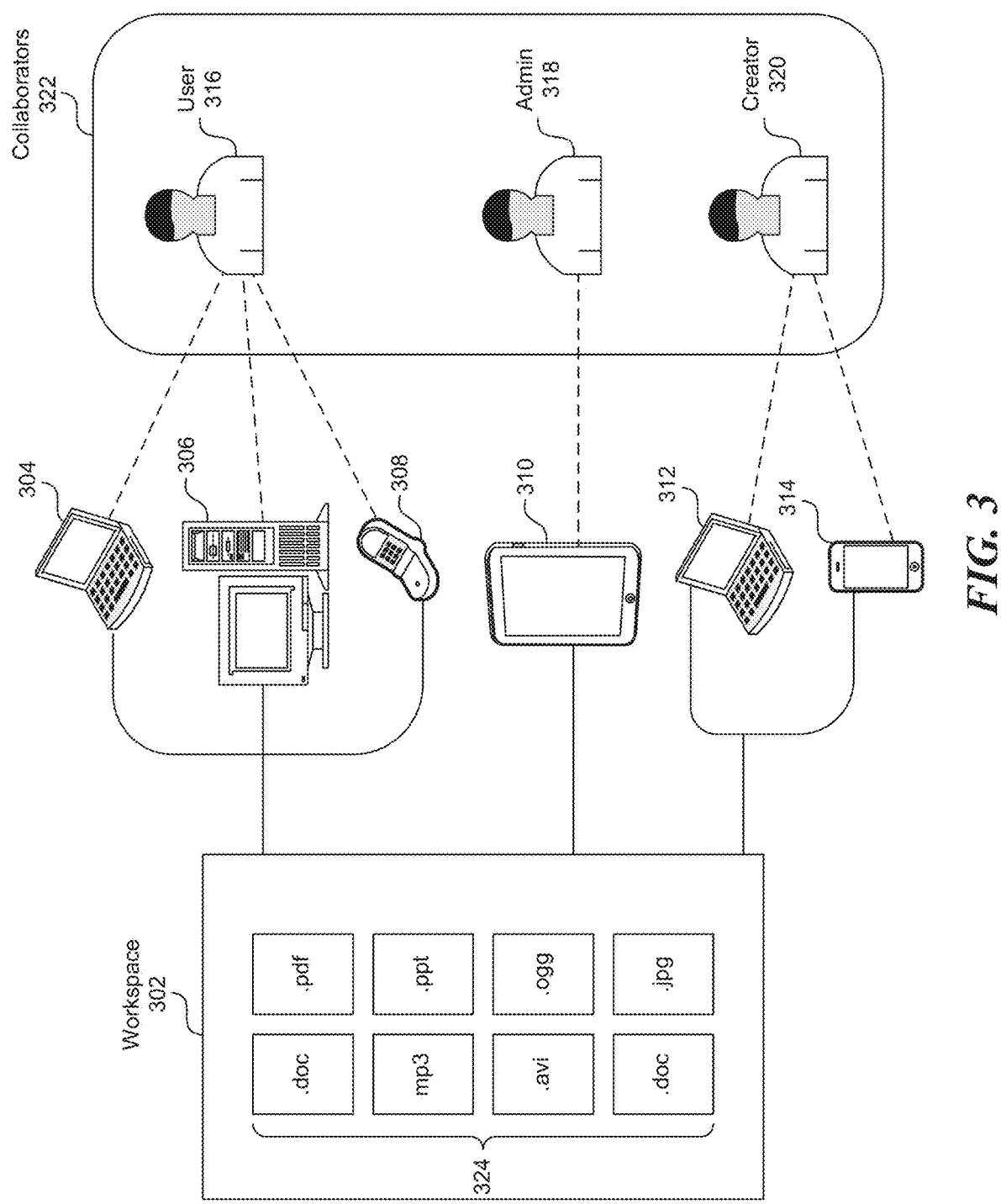
FIG. 3 depicts an example diagram of a workspace in an online or cloud-based collaboration platform accessible by multiple collaborators through various devices authorized to access the work space.

FIG. 3 depicts an example diagram of a workspace 302 in an online or web-based collaboration platform accessible by multiple collaborators 322 through various devices authorized to access the work space.

Each of users 316, 318, and 320 can individually use multiple different devices to access and/or manipulate work items 324 in the work space 302 with which they are associated. For example users 316, 318, 320 can be collaborators on a project to which work items 324 are relevant. Since the work items 324 are hosted by the collaboration platform (e.g., a cloud-based platform), each user can access the work items 324 anytime, and from any physical location using any device (e.g., including devices they own or any shared/public/loaner device).

Work items to be edited or viewed can be accessed from the workspace 302 in accordance with the platform and/or application independent mechanisms. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration platform.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Example Integrated Interactive Interface

A desktop application for providing access to a cloud-based collaboration platform can provide a seamless experience for desktop users. Some embodiments can provide access to all files stored at the cloud based collaboration platform, including files not associated with synchronized local copies at the client device. Additional example functions of the desktop application can include enabling shared drive replacement functionality, supporting virtual desktops (VDI) where synchronization is not viable, providing an incredibly fast, native experience (e.g., as opposed to access through a web-based application).

Some embodiments can also take advantage of OS-specific features and integration points. In some embodiments, a single installer can be used for all Box desktop features. For some embodiments, the desktop application can be OS specific, such as "Box for Windows" and "Box for Mac."

According to some embodiments, the desktop application can be pre-installed upon signing into a cloud-based collaboration account via a client device, or can be installed, using a single file that is associated with other applications for accessing a cloud based collaboration platform (e.g. Box Edit). The installed software can provide immediate access to all work items hosted at the cloud-based collaboration platform. There is no need to select folders and wait for initial synchronization, or select folders to synchronize.

According to some embodiments the desktop application can be written in, for example, Cross-platform Python code. The application includes straightforward UI work (e.g., as shown in FIGS. 4A-4I). In some embodiments, the desktop application Sync all file metadata locally (but only contents of synced files)

Some embodiments can also include features such as work item previews, comments, annotations, update feeds, in-app messaging to desktop users, dynamic caching of un-synchronized files, and opening of files directly from email links.

FIGS. 4A-4I respectively depict screenshot portions showing example user interfaces, each depicting one or more features enabling users to utilize a desktop application at a client device such as described herein for accessing a cloud-based collaboration platform.

Figure 4A:
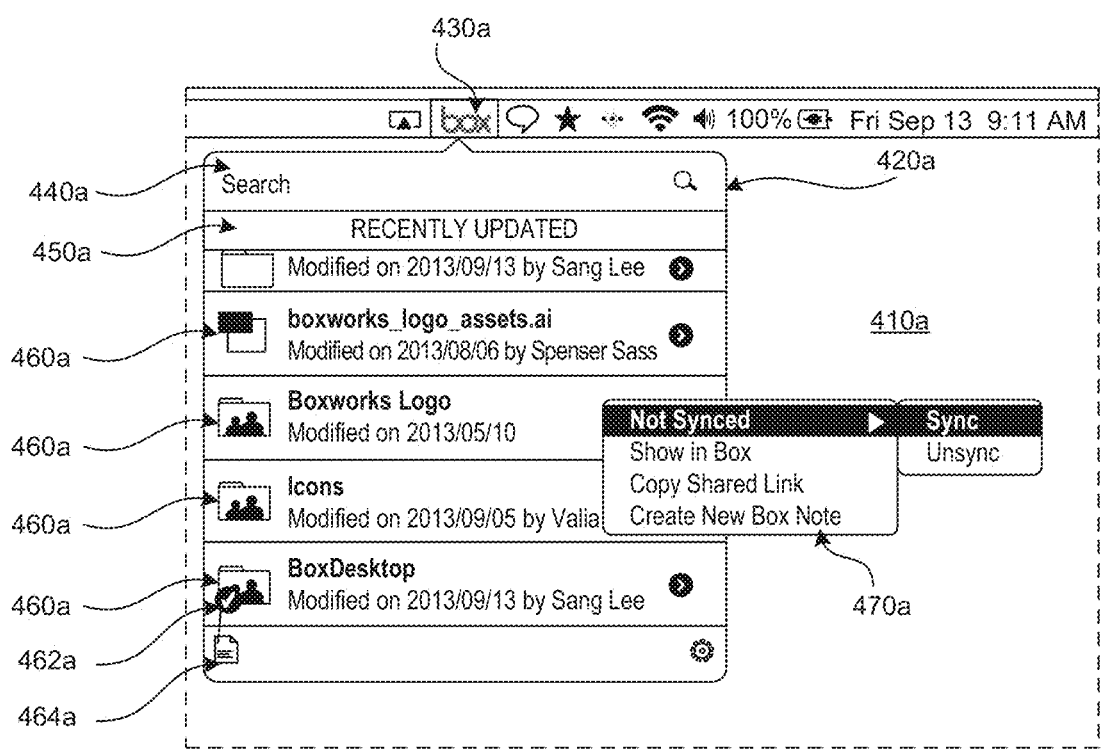
FIGS. 4A-4I respectively depict screenshot portions showing example user interfaces, each depicting one or more features enabling users to utilize a desktop application such as described herein for accessing a cloud-based collaboration platform.

FIG. 4A shows an example integrated interactive interface 420a for a desktop application, according to some embodiments. As shown in FIG. 4A, the example integrated interactive interface 420a may be integrated into the overall desktop interface 410a for the particular device. Accordingly, integrated interface 420a presents a seamless interface through which a user may access work items hosted at a cloud-based collaboration platform. According to some embodiments, integrated interface 420a includes features specific to an operating system of the client device. For example, according to some embodiments, display of work items via interactive interface 420a may follow that of other files stored on the local drive of the client device.

In an embodiment according to FIG. 4A a user accesses interface 420a by selecting (via an input device) menu item 430a. Integrated interactive interface 420a includes a listing of work items 460a hosted at the cloud-based collaboration platform (described above). As opposed to a synchronization client, all work items associated with a given account or workspace are displayed via interface 420a regardless of whether a synchronized local copy of a work item is available at the client device. Here, some of the plurality of displayed work items 460a are associated with synchronized local copies stored at the client device through and some are not. According to some embodiments, work items 460a with associated synchronized local copies may are identified with an icon overlay 462a. Here an icon overlay 462a with a "check box" indicates that a work item 460a hosted at the cloud-based collaboration platform is synchronized with a local copy of the work item at the client device. Work items 460a can be displayed via interactive interface 420a in a number of ways. Here, as shown by notification 450a the interactive interfaces lists work items 460a in an order based on recent updates. Alternatively, work items may be listed according to favorites, alphabetical order by title, in order of file type, chronologically based on the date the work item was created, etc. Work items may also be displayed in the list in a tree structure according to associated folders. Further, each listed work item 460a includes information regarding the file/folder, the date on which is was modified and the collaborator who modified it. The interface 420a may also include a search tool 440a to search all the work items accessible to the associated account.

A user can access contextual menus such as contextual menu 470a via interactive interface 420a. A contextual menu may be accessed by a user through an input provided via an input device. For example, a right click on a mouse may bring up contextual menu 470a. Again, functionalities, such a contextual menu functionality can implement the underlying functionality of an operating system of the client device.

Figure 5:
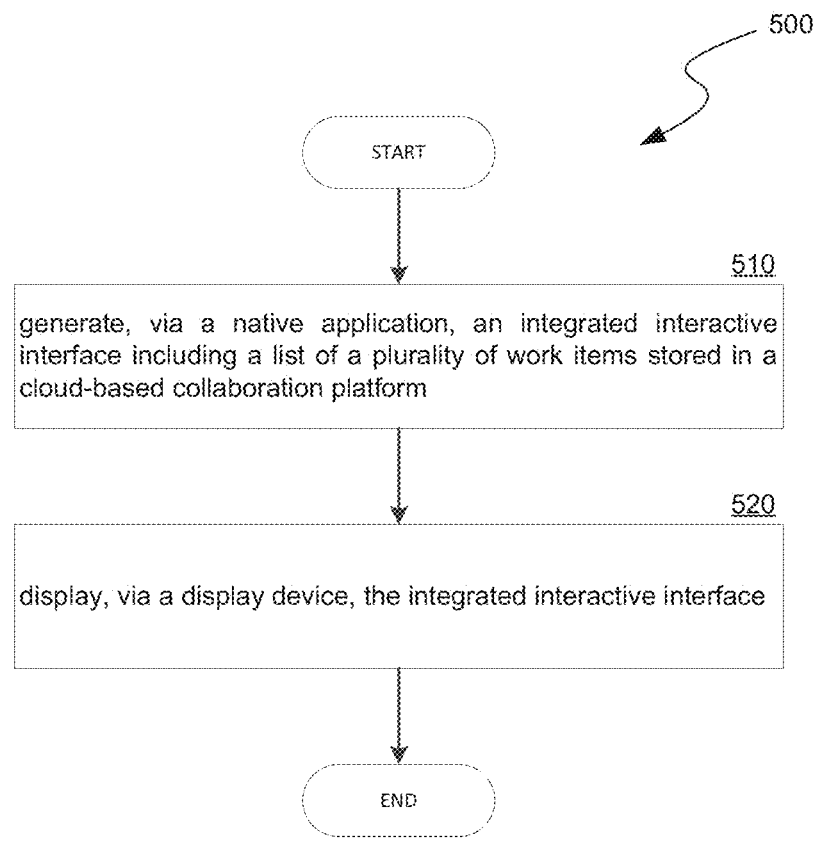
FIG. 5 shows a flowchart of an example process for providing an integrated interactive interface for accessing a cloud-based collaboration platform.

FIG. 5 shows an simplified example process 500 for providing an integrated interactive interface. At step 510 a native application (also referred to as a "desktop application" native to an operating system) generates an integrated interactive interface including a list of a plurality of work items stored at the cloud based platform. As previously stated, some of the listed plurality of work items will be associated with synchronized local copies stored at the client device and some will not. Further the integrated interactive interface is configured to enable a user to access one or more or more of the plurality of work items to enable a user to create a new work item to be stored in the cloud-based collaboration platform. The term "access" in this context may mean view, create, edit, move, save, etc. At step 520 the integrated interactive interface may be displayed via a display device of the client device.

FIGS. 4B-4I shows additional interfaces, which can be subpages under interface 420a of FIG. 4A, that have additional functions.

Figure 4B:
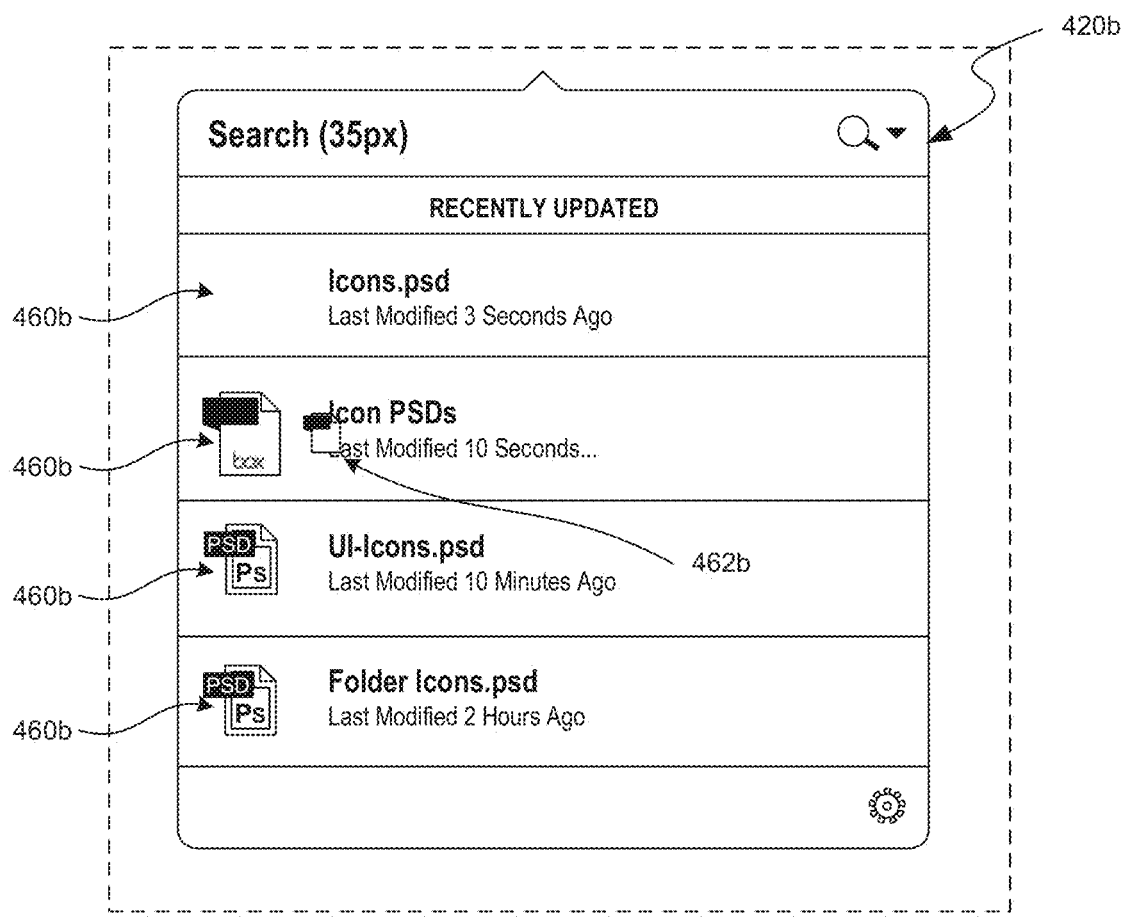

FIG. 4B shows an example interface 420b that includes a listing of work items 460b similar to the listing of work items in interface 420a of FIG. 4A. Interface 420b demonstrates a "drag and drop" functionality 426b for creating, uploading, or accessing work items hosted at a cloud-based collaboration platform. For example, a user may upload a file or folder stored at the client device by simply dragging and dropping an icon representing that file or folder into the interactive interface 420*b*. Similarly, a user may synchronize an unsynchronized work item 460*b* by selecting an icon representing that work item from the listing in interactive interface 460*b* and dragging the selected work item onto the desktop or into a finder window at a client device and dropping that selected work item. While the drag and drop functionality is illustrated in FIG. 4B with respect to interface 420*b*, it shall be understood that the same functionality may be applied via any of the interfaces shown in FIGS. 4A-4I.

Figure 4C:
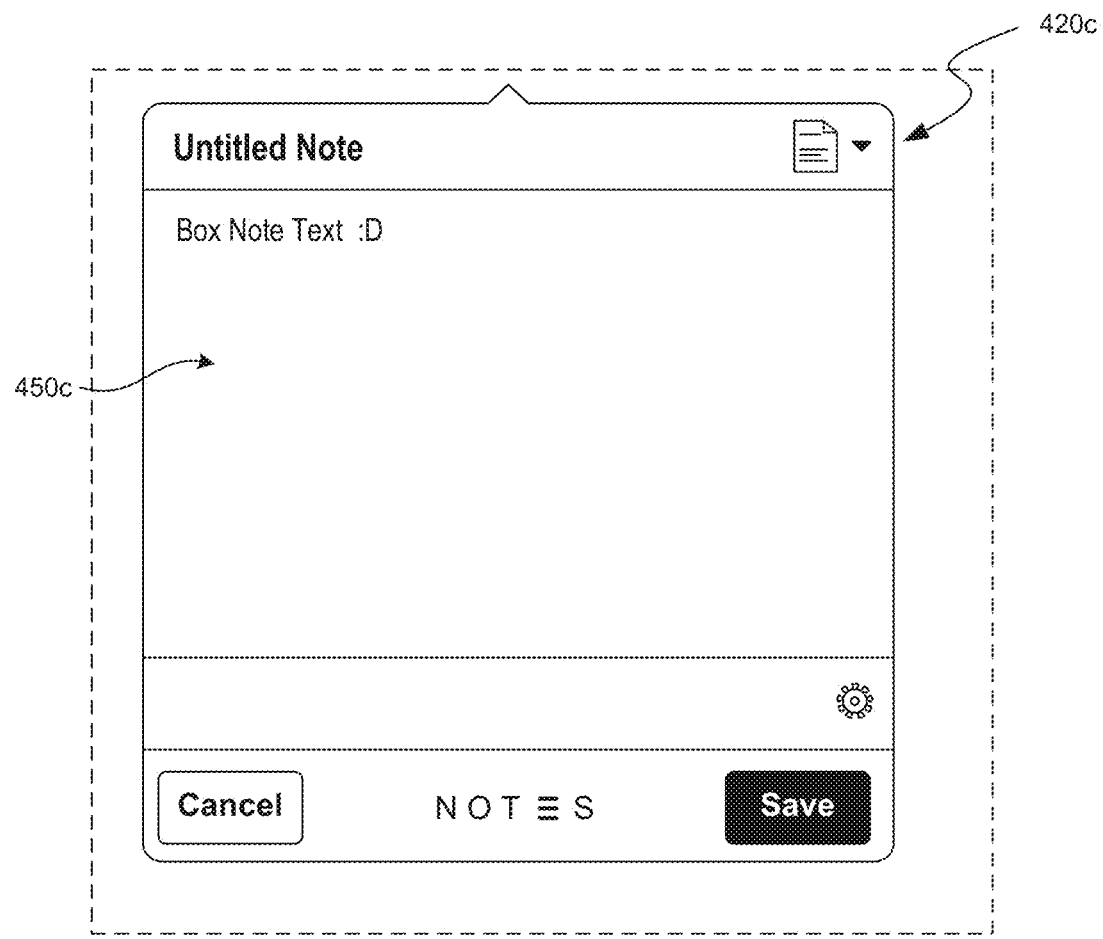

FIG. 4C shows an example interface 420*c* for creating a new work item to be hosted at the cloud-based collaboration platform. Here, interface 420*c* includes an editable field 450*c* for creating a text based-document without the need for a separate application. A user inputs text via an input device at the client device and can save the document to the cloud-based collaboration platform. Other types of documents may be created by a user using similar methods, for example, an illustration, a video, a picture, a CAD drawing, etc. Further, if certain document creation capabilities are required, a desktop application associated with interface 420*c* may identify a local application at the client device and may automatically open that local application through which a user may create the new document. For example, an option may be pre provided in interface 420*c* to create a new word document. If a user selects that option, a local instantiation of Microsoft® Word opens to create the document. Once the desktop application detects that the new document has been created, it may automatically upload the newly created document to the cloud-based collaboration platform.

Figure 6:
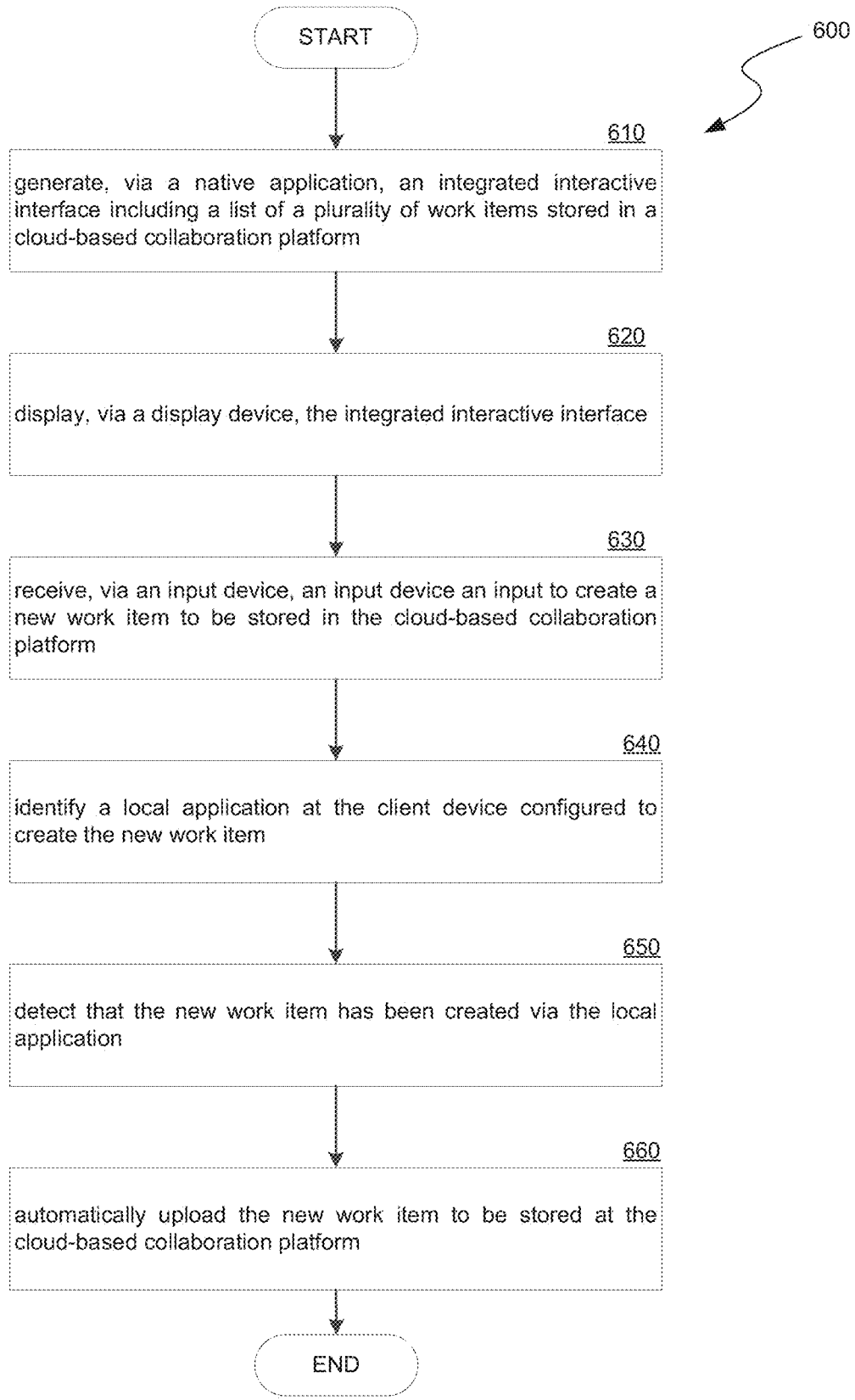
FIG. 6 shows a flowchart example process for creating a work item via an integrated interactive interface for accessing a cloud-based collaboration platform.

FIG. 6 shows an example process 600 for creating a new work item similar to as shown in FIG. 4C. Steps 610 and 620 are similar to steps 510 and 520, described with reference to FIG. 5. Returning to FIG. 6, at step 630 an input from a user may be received via an input device (e.g. touch screen display) to create a new work item to be stored at the cloud-based collaboration platform. At step 640 the desktop application may identify a local application at the client device configured to create the new work item. According to some embodiment, the desktop application providing the integrated interactive interface may include functionality to create a new work item (see e.g., interface 420*c* in FIG. 4C). According to some embodiments, the desktop application may identify a third-party application (e.g. Microsoft® Word) capable of creating a new work item. At step 650 the desktop application may detect that a new work item has been created and may at step 660 automatically upload the new work item to a host server of a cloud-based collaboration platform. According to some embodiments, the desktop application automatically deletes any local copy of the newly created work item after uploading to the cloud-based collaboration platform.

Figure 4D:
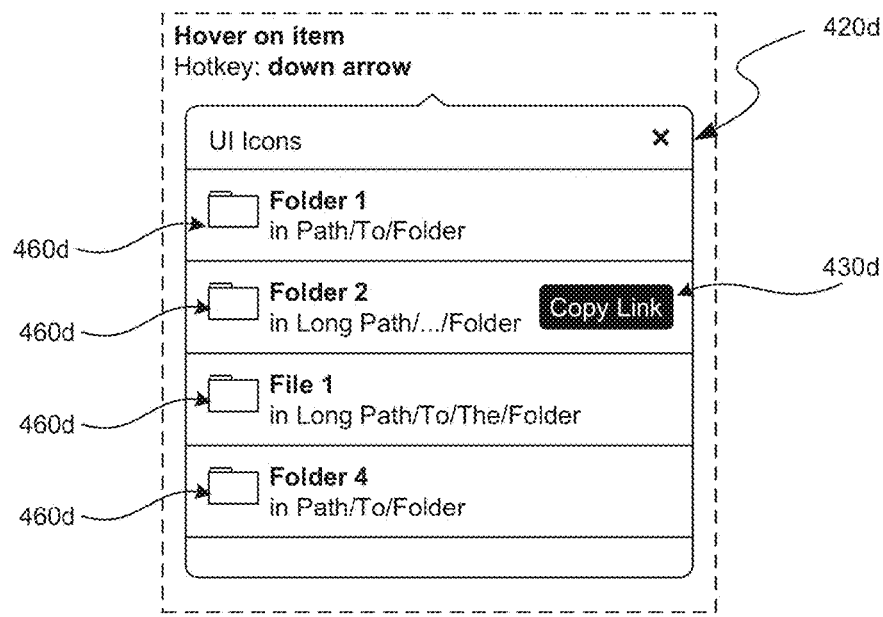

FIG. 4D shows an example interface 420*d* through which a user may copy link to one or more work items 460*d* hosted at a cloud based collaboration platform. According to some embodiments, by hovering a cursor over a work item 460*d* (e.g. using an input device) an option 430*d* may be presented to a user to copy a link. The copied link may then be sent to another collaborator via a messaging system (e.g. email).

Figure 4E:
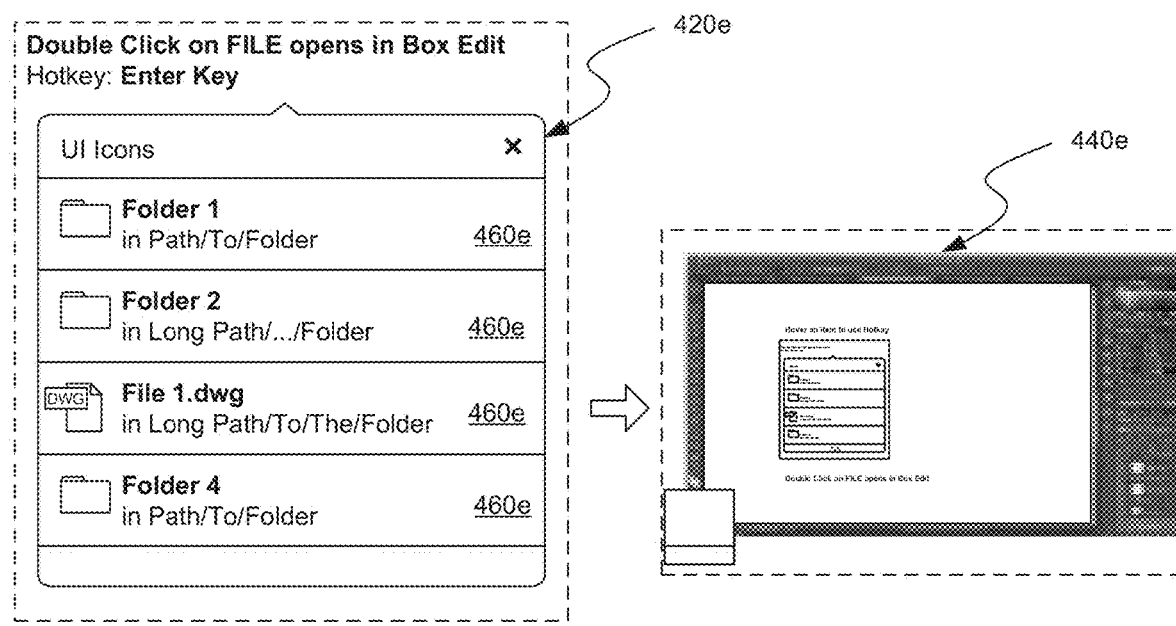

FIG. 4E shows an example interface 420*e* through which a user can access a work item 460*e* that is hosted at a cloud-based collaboration platform but not synchronized o the local client device. According to some embodiments, when a user double clicks (e.g. via an input device) a work item 460*e* the desktop application may facilitate the user with access to the work item hosted at the cloud-based collaboration platform. This process is described in part with reference to FIGS. 7A and 7C.

Figure 7A:
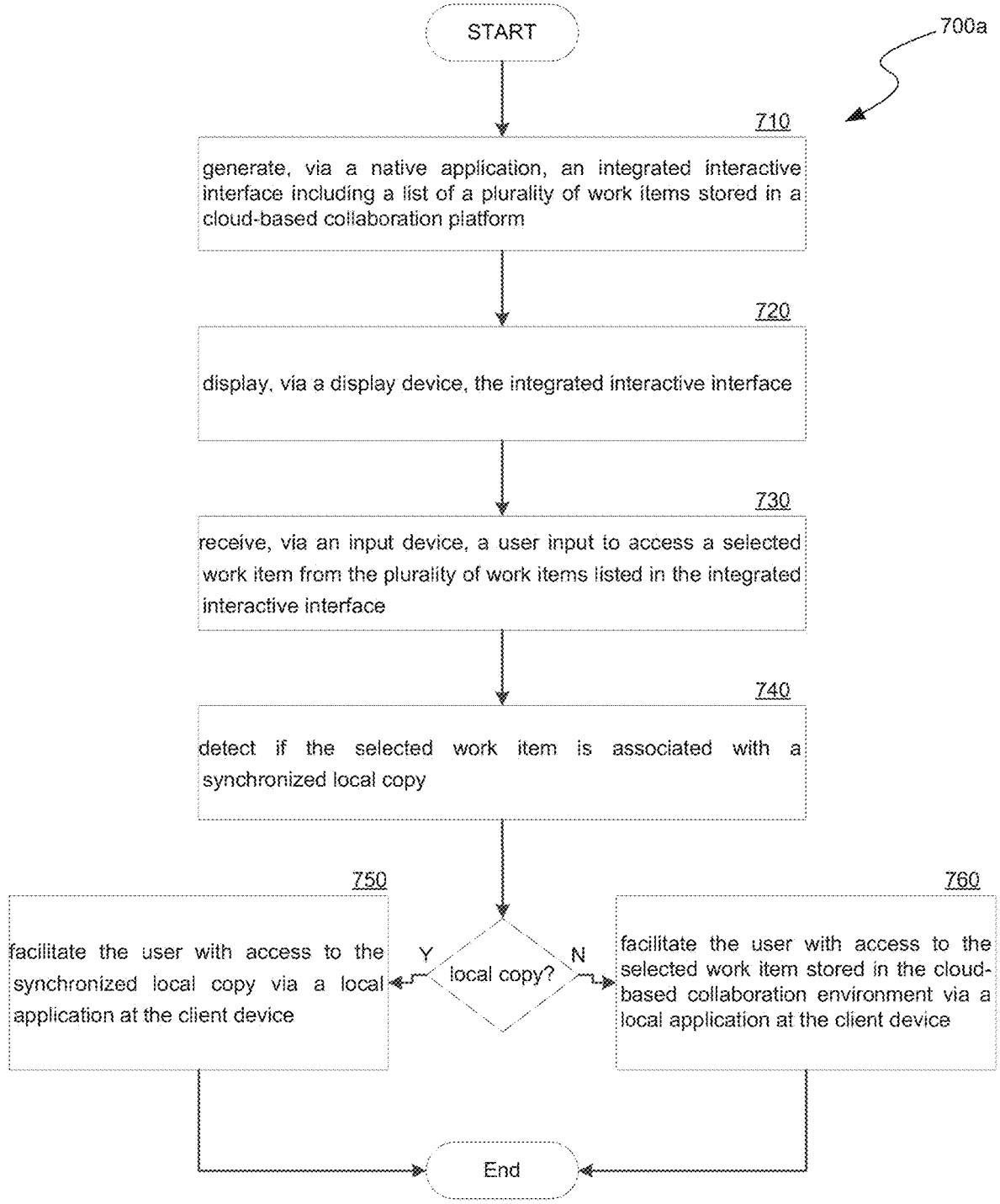
FIGS. 7A-7C show flowcharts for example processes for accessing work items via an integrated interactive interface for accessing a cloud-based collaboration platform.

FIG. 7A shows an example process 700*a* for accessing a work item hosted at the cloud-based collaboration platform via an integrated interactive interface. Steps 710 and 720 are similar to steps 510 and 520, described with reference to FIG. 5. At step 730, the desktop application receives via an input device, a user input (e.g., a double click) to access a selected work item from the plurality of work items listed in the integrated interactive interface. At step 740 the desktop application detect if the selected work item is associated with a synchronized local copy at the client device. In FIG. 4E, work items 460*e* are not associated with synchronized local copies at the client device. Returning to FIG. 7A, at step 760, if the selected work item is not associated with a synchronized local copy, the desktop application facilitates the user with access to the work item stored at a host server of the cloud-based collaboration platform via a local application at the device. According to some embodiments, the local application can include an application associated with the desktop application (e.g., Box Edit). According to some embodiments, the local application is associated with a file type of the selected work item. For example, if the user selects a Word document hosted at the cloud-based collaboration platform and that Word document is not associated with a synchronized local copy, the desktop application may identify a local instantiation of the Microsoft Word application through which access to the document stored at the cloud-based collaboration platform may be provided.

Figure 7B:
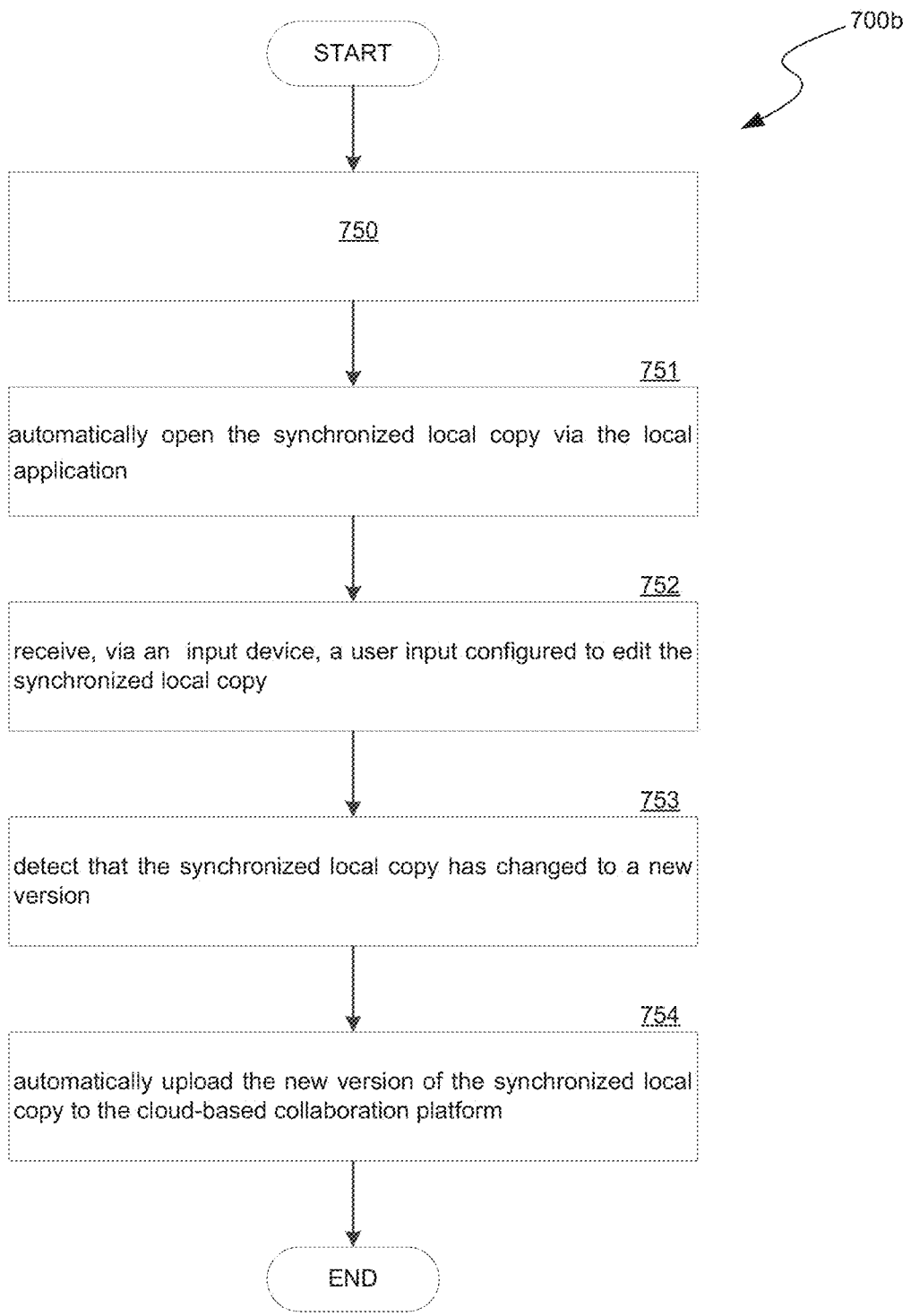
Figure 7C:
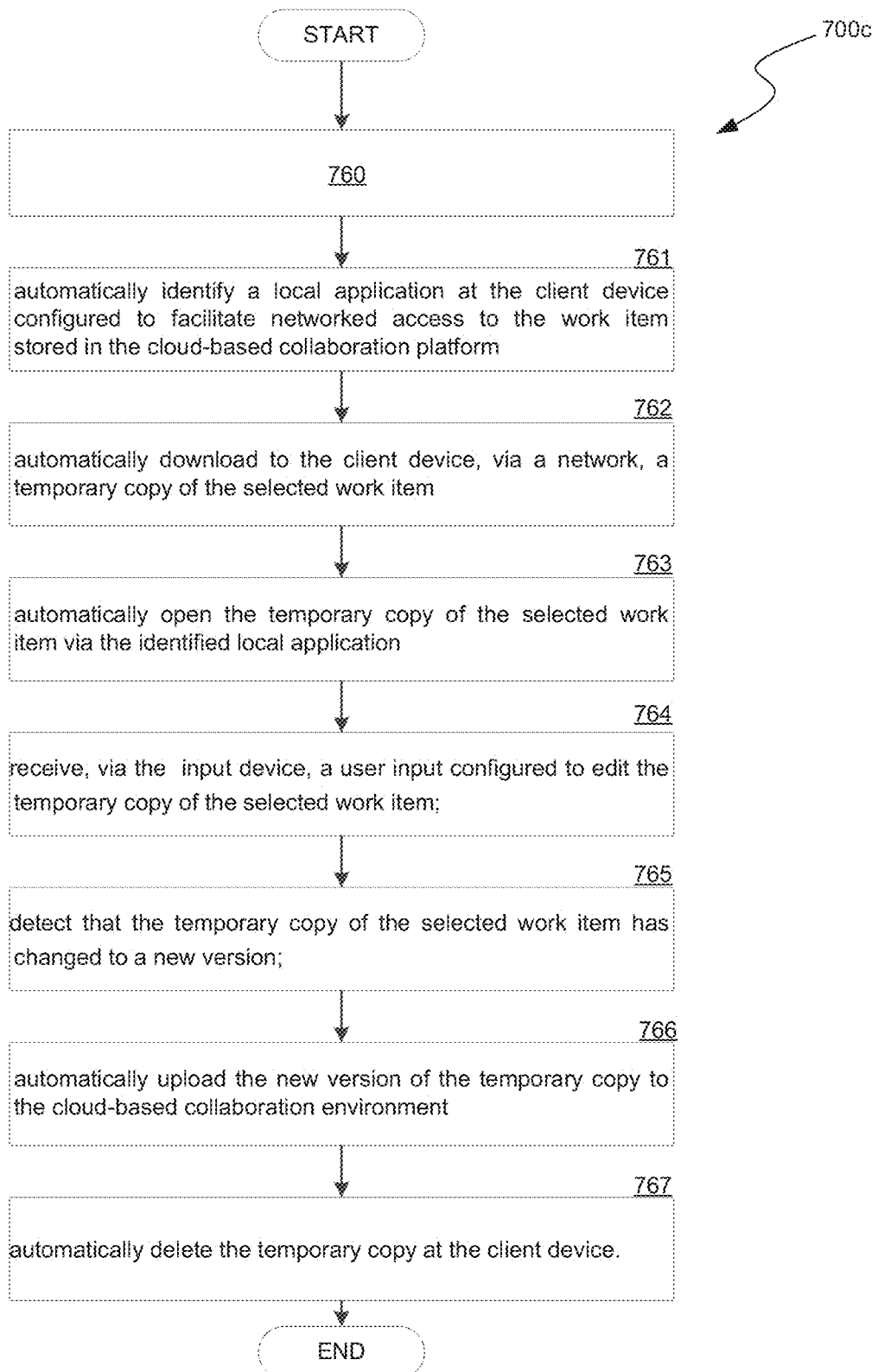

FIG. 7C shows an example process 700*c*, which according to some embodiments, may include steps that comprise step 760 of FIG. 7A. With reference to FIG. 7C, at step 761, a desktop application automatically identifies a local application (e.g. Microsoft Word) at the client device configured to facilitate networked access to the work item stored in the cloud-based collaboration platform. At step 762, the desktop application may automatically download to the client device, via a network, a temporary copy of the selected work item. At step 763, the desktop application may automatically open the temporary copy of the selected work item via the identified local application (e.g. open a temporary Word .doc file in local instantiation of Microsoft Word). At step 764, the desktop application receives, via the input device, a user input configured to edit the temporary copy of the selected work item. At step 765, the desktop application detects that the temporary copy of the selected work item has changed to a new version. In other words that the user has made a change to the temporary copy of the work item. At step 766, the desktop application automatically uploads the new version of the temporary copy to the cloud-based collaboration platform. Finally, at step 767, the desktop application automatically deletes the temporary copy of the selected work item at the client device.

Process 700*c* represents one embodiment for facilitating the user with access to a selected work item at a cloud based collaboration platform. Alternatively, the local application may facilitate access via a process of application streaming. In other words, a local application may receive edit inputs from a user, via an input device, and stream commands associated with those inputs to another application at a server side that may edit the work item stored at the server side. Using this method, the desktop application can avoid having to download a temporary copy of the selected work item.

Figure 4F:
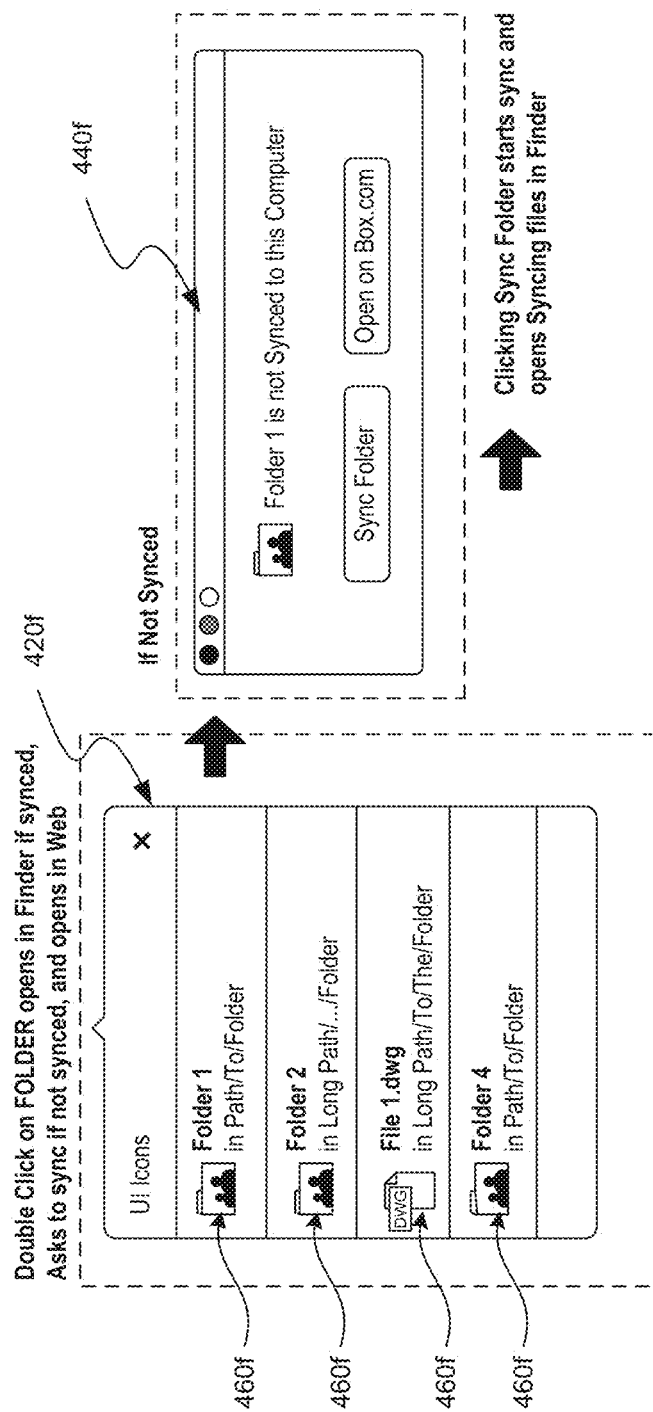

FIG. 4F shows shoes an example interface 420f through which a user may be provided an option to synchronize a selected work item with a synchronized local copy at the client device or open the selected work item via a web client. According to some embodiments, A user may select (e.g. via a double click) one or more work items 460f listed in interface 420f. If the selected work item is not associated with a synchronized local copy at the client device, the desktop application can provide the user with an options 440f to either synchronized the selected work item (i.e. create a synchronized local copy), or open the selected work item via an alternative viewing client, such as a web client.

Figure 4G:
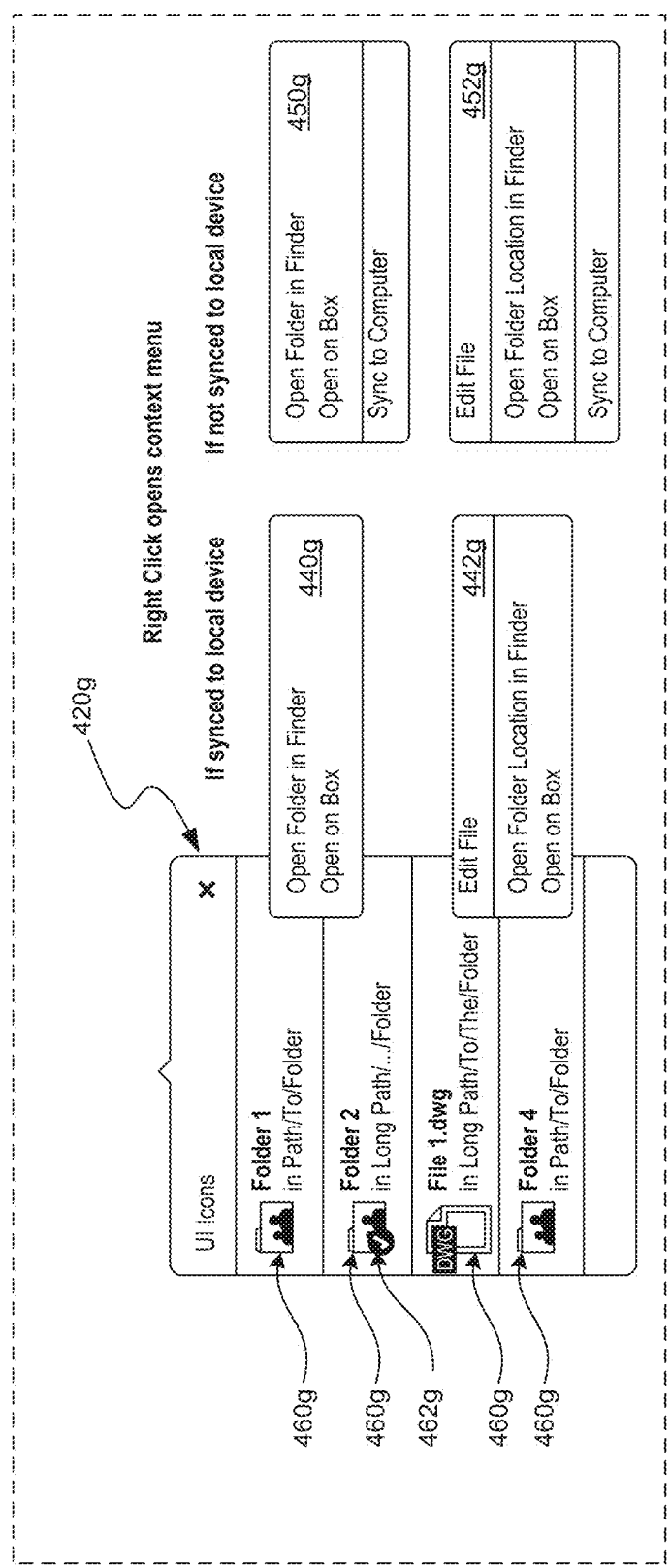

FIG. 4G shows an example interface 420g through which a user can access a work item 460g that is hosted at a cloud based collaboration platform. As previously mentioned, some work items 460g may be associated with synchronized local copies (e.g. as indicated by an icon overlay 462g) and some may not be associated with synchronized local copies. According to some embodiments, when a user selects (e.g. via a right click of a mouse) a work item 460g a contextual menu 440g-452g comes up providing the user with options to access the selected work item 460g.

If a selected work item 460g is not associated with a synchronized local copy, a contextual menu 450g (if a folder) or 452g (if a file) may be displayed. As shown in FIG. 4G, menu 450g provides the user with options to open the non-synchronized folder in the operating system finder, open the folder via an alternative viewing client (such as a web client) or to synchronize the folder to the local device. Similarly, menu 452g provides the user with options to open the folder location in the finder, open the file via the web client, synchronize the file, or directly access or "edit" the remotely stored file hosted at the cloud-based collaboration platform. The process of directly accessing the file is previously discussed with reference to FIGS. 4E, 7A, and 7C.

If a selected work item 460g is associated with a synchronized local copy, a contextual menu 440g (if a folder) or 442g (if a file) may be displayed. As shown in FIG. 4G, menu 440g provides the user with options to open the synchronized folder in the operating system finder or open the folder via a web client. Similarly, menu 442g provides the user with options to open the folder location in the finder, open the file via the an alternative viewing client (e.g., web client), or directly access or "edit" the selected file.

Returning to FIG. 7A, at step 750, if the selected work item is associated with a synchronized local copy, the desktop application facilitates the user with access to the synchronized local copy stored at a client device via a local application at the client device.

FIG. 7B shows an example process 700b, which according to some embodiments, may include steps that comprise step 750 of FIG. 7A. At step 751, the desktop application automatically opens the synchronized local copy of the selected work item via a local application at the client device. For example, if the selected work item is a Word .doc file, the desktop application will automatically open the synchronized local copy of the .doc file via a locally instantiated copy of the Microsoft Word application. At step 752, the desktop application receives, via an input device, a user input configured to edit the synchronized local copy. This input may be initially received via the local application. For example the user may edit the synchronized local copy of a .doc file via a locally instantiated copy of Microsoft Word. Edits to the synchronized work item received by the Word application may be relayed to the desktop application. At step 753, the desktop application may detect that the synchronized local copy has changed to a new version. Again, this information may be relayed form the local application through which the user is editing the file. At step 753, the desktop application automatically uploads the new version of the synchronized local copy to the cloud-based collaboration platform. According to some embodiments, this step may be performed in response to a user input to save the work item provided via the local application.

Figure 4H:
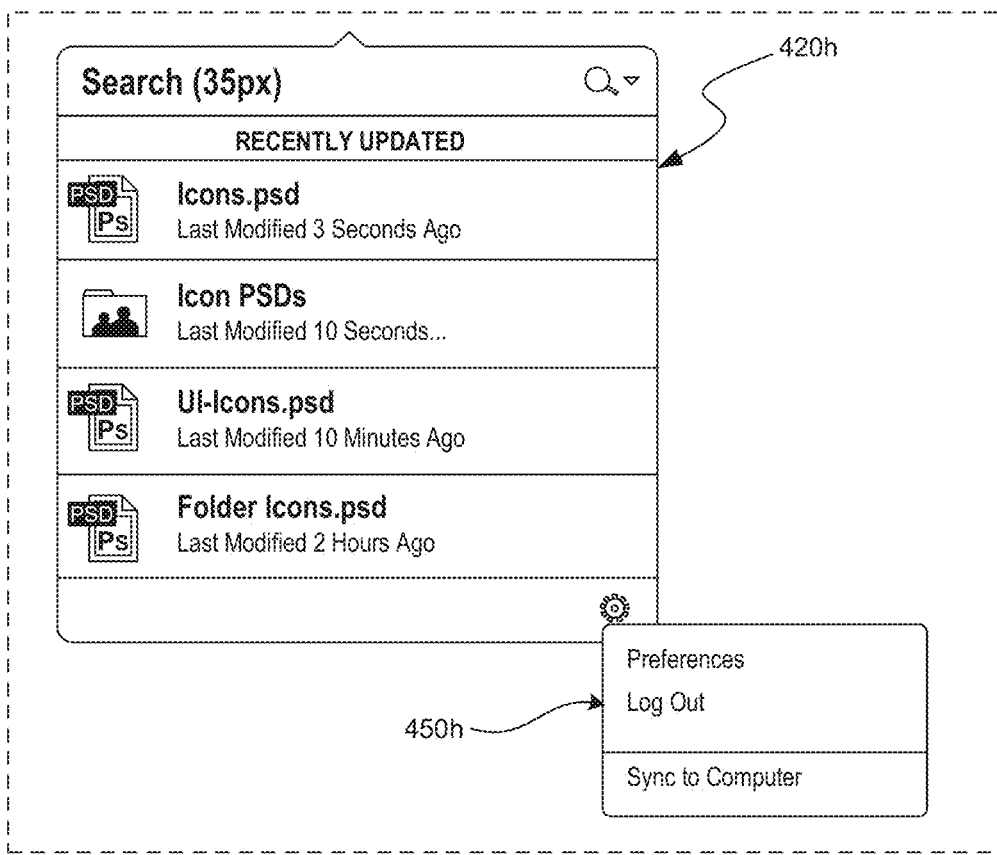
Figure 4I:
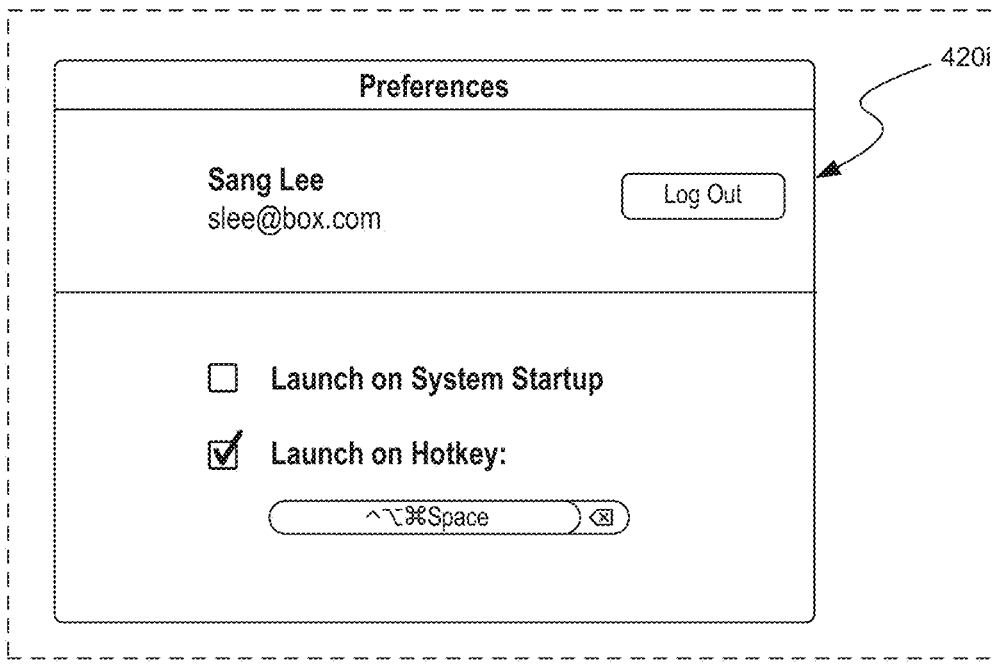

Additional example functions and interfaces are illustrated in FIGS. 4H and 4I. As shown in FIG. 4H, an interface 420h may include options 450h to edit preferences for the desktop application, log out of the collaboration platform account, or synchronize work items to the local device. FIG. 4I shows an example interface 420i for editing preferences for a desktop application, according to some embodiments.

Computer Devices/Systems

Figure 8:
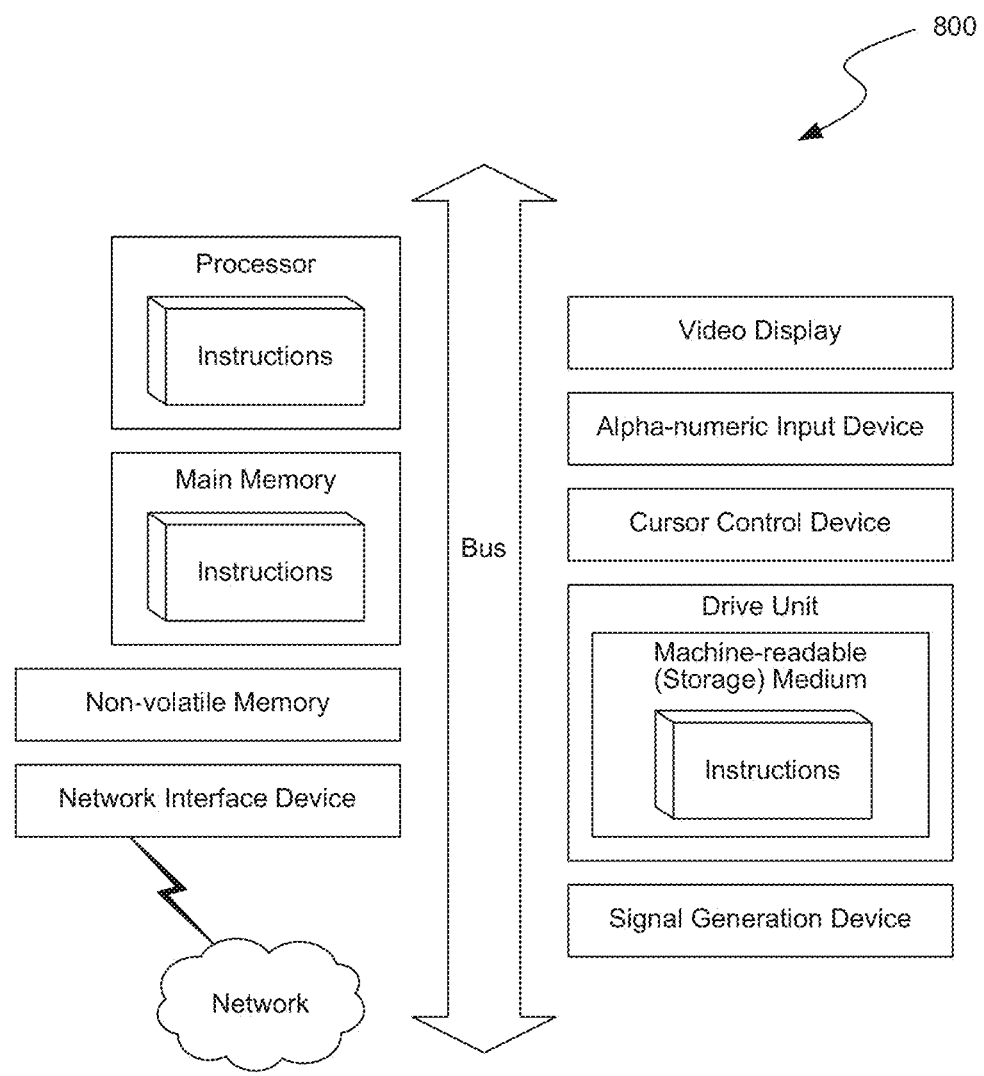
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine 800 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While some aspects of the disclosure may be presented herein in some claim forms, the inventors contemplate the various aspects of the disclosure in any number of claim forms. For example, while only one aspect of the disclosure is recited as a means-plus-function claim under 35 U.S.C. § 112(f), other aspects can likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A computer-implemented method for facilitating access to shared work items hosted by a cloud-based collaboration platform via a client device communicatively coupled to the cloud-based collaboration platform via a computer network, the method comprising:

> generating, by a first application executing on the client device, an integrated graphical user interface (GUI) comprising a list of a plurality of shared work items stored in the cloud-based collaboration platform and available to a user of the client device, the list of the plurality of shared work items comprising both shared work items having a synchronized local copy on the client device and shared work items not having a synchronized local copy on the client device, each work item comprising a file type of a plurality of different file types, each of the plurality of different file types associated with a different local application of a plurality of local applications executing on the client device, wherein the integrated GUI is generated in response to an input indicating a request by the user of the client device to access one or more of the plurality of shared work items;
> causing display, via a display of the client device, of the integrated GUI;
> receiving, by the first application, via an input device of the client device, a user input indicative of a request to access a selected shared work item from the plurality of shared work items listed in the integrated GUI;
> determining, by the first application, if the selected shared work item is associated with a synchronized local copy stored at the client device in response to the user input; and
> conditionally providing access, by the first application, to either a synchronized local copy of the selected shared work item or a downloaded temporary copy of the selected shared copy of the work item based on the determining, wherein;
>> if the selected shared work item is associated with a synchronized local copy:
>>> causing a second application at the client device to open automatically the synchronized local copy of the selected shared work item, the second application comprising one of the plurality of local applications executing on the client device and selected from the plurality of local applications based on the file type of the selected shared work item; and
>> if the selected shared work item is not associated with a synchronized local copy:
>>> downloading automatically, via a computer network, a temporary copy of the selected shared work item from a host server of the cloud-based collaboration platform to the client device;
>>> causing the second application to open automatically the downloaded temporary copy of the selected shared work item:
>>> detecting that the temporary copy of the selected shared work item has changed to a new version based on user edits to the temporary copy;
>>> automatically uploading the new version of the temporary copy including the user edits to the cloud-based collaboration platform; and
>>> automatically deleting the temporary copy at the client device.

2. The method of claim 1, further comprising enabling editing of the selected shared work item via the second application.

3. The method of claim 1, wherein the integrated GUI includes features specific to an operating system of the client device.

4. The method of claim 1, wherein the integrated GUI is displayed via a remote virtual desktop.

5. The method of claim 1, further comprising:
> receiving, via an input device of the client device, a user input to create a new work item to be stored in the cloud-based collaboration platform;
> identifying a third application at the client device configured to create the new work item;
> detecting that a new work item has been created by the third application; and
> automatically uploading the new work item to be stored at the cloud-based collaboration platform.

6. The method of claim 1, further comprising:
> providing the user with an option to synchronize the selected shared work item with a synchronized local copy at the client device if a synchronized local copy is not available.

7. The method of claim 1, further comprising:
> facilitating the user with access to the selected shared work item stored in the cloud-based collaboration platform via an alternative viewing client if a synchronized local copy is not available.

8. The method of claim 1, wherein the second application at the client device is associated with a file type of the selected shared work item.

9. The method of claim 1, further comprising:
> detecting that the synchronized local copy has changed to a new version; and
> automatically uploading the new version of the synchronized local copy to the cloud-based collaboration platform.

10. The computer-implemented method of claim 1, wherein each shared work item in the list having asynchronized local copy on the client device is identified with an icon in the integrated GUI.

11. A client device for facilitating access to shared work items hosted by a cloud-based collaboration platform, the client device comprising:
> a processor;
> a display device;
> a storage device;
> an input device configured to receive user inputs; and
> a memory unit having a first application stored thereon, the first application including instructions, which when executed by the processor, cause the client device to:
>> generate, by the first application, an integrated graphical user interface (GUI) comprising a list of a plurality of shared work items stored in the cloud-based collaboration platform and available to a user of the client device, the list of the plurality of shared work items comprising both shared work items having a synchronized local copy on the client device and shared work items not having a synchronized local copy on the client device, each work item comprising a file type of a plurality of different file types, each of the plurality of different file types associated with a different local application of a plurality of local applications executing on the client device, wherein the integrated GUI is generated in response to an input indicating a request by the user of the client device to access one or more of the plurality of shared work items;
>> cause display, via the display device, of the integrated GUI;

receive, via the input device, a user input indicative of a request to access a selected shared work item from the plurality of shared work items listed in the integrated GUI;
determine if the selected shared work item is associated with a synchronized local copy stored at the client device in response to the user input; and
conditionally provide access to either a synchronized local copy of the selected shared work item or a downloaded temporary copy of the selected shared copy of the work item based on the determining, wherein;
  if the selected shared work item is associated with a synchronized local copy:
    cause a second application at the client device to open automatically the synchronized local copy of the selected shared work item, the second application comprising one of the plurality of local applications executing on the client device and selected from the plurality of local applications based on the file type of the selected shared work item; and
  if the selected shared work item is not associated with a synchronized local copy:
    download automatically, via a computer network, a temporary copy of the selected shared work item from a host server of the cloud-based collaboration platform to the storage device;
    cause the second application to open automatically the downloaded temporary copy of the selected shared work item;
    detect that the temporary copy of the selected shared work item has changed to a new version;
    automatically upload the new version of the temporary copy of the selected shared work item to the cloud-based collaboration platform; and
    automatically delete the new version of the temporary copy of the selected shared work item from the storage device.

12. The client device of claim 11, wherein the first application includes further instructions, which when executed by the processor, cause the client device to further enable editing of the selected shared work item.

13. The client device of claim 11, wherein the memory unit further has stored thereon, an operating system, wherein the integrated GUI includes features specific to the operating system.

14. The client device of claim 11, wherein the first application includes further instructions, which when executed by the processor, cause the client device to display the integrated GUI via a remote virtual desktop.

15. The client device of claim 11, wherein the first application includes further instructions, which when executed by the processor, cause the client device to further:
receive, via the input device, a user input to create a new work item to be stored in the cloud-based collaboration platform;
identify a third application configured to create the new work item;
detect that a new work item has been created by the third application; and
automatically upload the new work item to be stored at the cloud-based collaboration platform.

16. The client device of claim 11, wherein the second application is associated with a file type of the selected shared work item.

17. The client device of claim 11, wherein the first application further includes instructions, which when executed by the processor, cause the client device to further:
detect that the synchronized local copy has changed to a new version; and
automatically upload the new version of the synchronized local copy to the cloud-based collaboration platform.

18. The client device of claim 11, wherein each shared work item in the list having a synchronized local copy on the client device is identified with an icon in the integrated GUI.

19. A non-transitory computer-readable medium having instructions stored thereon, which when executed by a client device in communication with a cloud-based collaboration platform via a computer network, cause the client device to:
generate, by a first application executing on the client device, an integrated graphical user interface (GUI) comprising a list of a plurality of shared work items stored in the cloud-based collaboration platform and available to a user of the client device, each work item comprising a file type of a plurality of different file types, each of the plurality of different file types associated with a different local application of a plurality of local applications executing on the client device, the list of the plurality of shared work items comprising both shared work items having a synchronized local copy on the client device and shared work items not having a synchronized local copy on the client device, wherein the integrated GUI is generated in response to an input indicating a request by the user of the client device to access one or more of the plurality of shared work items;
cause display, via a display device of the client device, of the integrated GUI;
receive, via an input device of the client device, a user input indicative of a request to access a selected shared work item from the plurality of shared work items listed in the integrated GUI;
determine if the selected shared work item is associated with a synchronized local copy stored at the client device in response to the user input; and
conditionally provide access to either a synchronized local copy of the selected shared work item or a downloaded temporary copy of the selected shared copy of the work item based on the determining, wherein;
  if the selected shared work item is associated with a synchronized local copy:
    cause a second application at the client device to open automatically the synchronized local copy of the selected shared work item, the second application comprising one of the plurality of local applications executing on the client device and selected from the plurality of local applications based on the file type of the selected shared work item; and
  if the selected shared work item is not associated with a synchronized local copy:
    download automatically, via the computer network, a temporary copy of the selected shared work item from a host server of the cloud-based collaboration platform to the client device;
    cause the application to open automatically the downloaded temporary copy of the selected shared work item;
    detect that the temporary copy of the selected shared work item has changed to a new version;

automatically upload the new version of the temporary copy of the selected shared work item to the cloud-based collaboration platform; and automatically delete the new version of the temporary copy of the selected shared work item from the client device.

20. The non-transitory computer-readable medium of claim 19 having further instructions stored thereon, which when executed by the client device, cause the client device to further:

detect that the synchronized local copy has changed to a new version; and automatically upload the new version of the synchronized local copy to the host server of the cloud-based collaboration platform.

21. The non-transitory computer-readable medium of claim 19, wherein each shared work item in the list having asynchronized local copy on the client device is identified with an icon in the integrated GUI.

* * * * *